Figure 1:
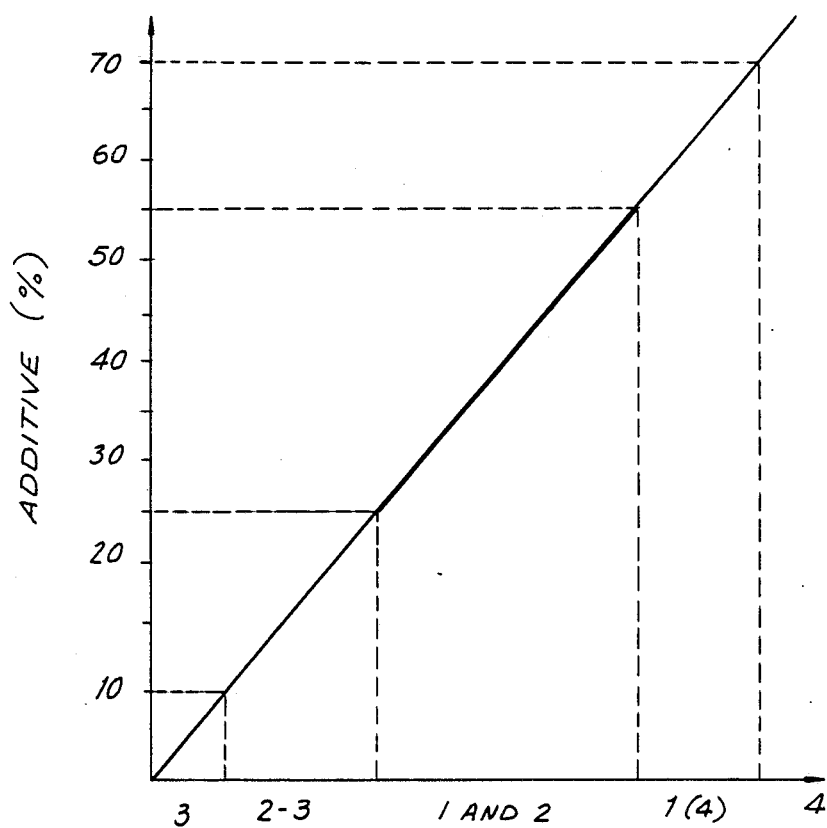

United States Patent [19]

Drawert et al.

[11] Patent Number: 4,655,836
[45] Date of Patent: Apr. 7, 1987

[54] NONSLIP PRINTING INK COMPOSITIONS

[75] Inventors: Manfred Drawert, Froendenberg; Horst Krase, Hamm, both of Fed. Rep. of Germany

[73] Assignee: Schering Aktiengesellschaft, Berlin and Bergkamen, Fed. Rep. of Germany

[21] Appl. No.: 732,923

[22] Filed: May 13, 1985

[30] Foreign Application Priority Data

May 29, 1984 [DE] Fed. Rep. of Germany ....... 3420009

[51] Int. Cl.$^4$ ............................................. C09D 11/10
[52] U.S. Cl. ..................................... 106/26; 106/27; 260/DIG. 38; 528/295.5; 528/335
[58] Field of Search ............................ 106/20, 26, 27; 528/295.5, 335; 260/DIG. 38

[56] References Cited

U.S. PATENT DOCUMENTS

| | | | |
|---|---|---|---|
| 3,622,604 | 11/1971 | Drawert et al. | 106/20 |
| 3,900,436 | 8/1975 | Drawert et al. | 106/27 |
| 4,122,229 | 10/1978 | Mitchell, III et al. | 428/261 |
| 4,533,524 | 8/1985 | Burba et al. | 524/297 |

FOREIGN PATENT DOCUMENTS

| | | |
|---|---|---|
| 678508 | 9/1966 | Belgium . |
| 113002 | 7/1984 | European Pat. Off. . |
| 2140615 | 1/1973 | France . |

Primary Examiner—Amelia B. Yarbrough
Attorney, Agent, or Firm—Curtis, Morris & Safford

[57] ABSTRACT

Polyamide condensation products, adaptable to use as antislip agents, formed between 1.5 to 2 equivalent parts of a polymerized fatty acid and 1 equivalent part of an amine component comprising a diprimary ether diamine, optionally together with a co-diamine, and nonslip coating compositions comprising such an antislip agent and a printing ink binder optionally together with solvents, dyes, pigments, antioxidants and the like.

12 Claims, 2 Drawing Figures

EVALUATION OF INCREASING
NONSLIP EFFECT

EVALUATION OF INCREASING NONSLIP EFFECT

EVALUATION OF INCREASING
NONSLIP EFFECT

NONSLIP PRINTING INK COMPOSITIONS

The present invention relates to polyamide condensation products, comprising polymerized fatty acids and diprimary ether diamines, having antislip properties, and to nonslip coating compositions, particulary printing inks, containing the same.

Mass produced articles today are increasingly packaged in films or sheets made of a variety of plastics, for example polyethylene, polypropylene, polyvinyl chloride, polyester, or paper. While these offer many advantages, the larger sizes of bags or sacks made of such sheeting have the drawback that they can only be stacked to a limited extent. Because of the smooth surfaces of these materials, they do not lie solidly on top of one another but readily start to slide. Printing them with conventional printing inks has failed to bring about any improvement.

Various attempts have been made to impart nonslip properties to these smooth surfaces by adding fillers such as titanium dioxide or by spraying or printing with coating compositions having an antislip effect.

To achieve a nonslip effect, special additives are usually admixed with the conventional binders for printing inks. These additives must meet a number of requirements all at once, namely:

1. They must impart nonslip properties to the resins for a period in excess of the normal storage time.
2. They must be compatible with the printing ink binders commonly used in this field.
3. They must be compatible with the solvents commonly used with printing ink binders.
4. They must be resistant to blocking when admixed with the printing ink binders.

Moreover, these additives should impair neither the adhesion of the binder to the various substrates nor the surface structure or the gloss of the fully cured coating film.

Condensation products of polymerized fatty acids and excess polyamines have produced some improvement in a few printing ink binders over filler additives with respect to the desired nonslip properties, but they have fallen short of satisfying other practical requirements. For example, the nonslip effect, though initially present, disappears in a relatively short time due to carbonatization or carbamatization of the free amino groups; the resulting products are not compatible with the binders commonly used in this field, especially nitrocellulose, and in many cases the coating film is adversely affected.

The present invention thus has as its object to overcome these drawbacks of the prior art and to provide a process which meets practical requirements with respect to the properties of nonslip coating compositions.

In accordance with the invention, this object is accomplished with nonslip coating compositions comprising (1) commonly used printing ink binders and (2) antislip additives, optionally with the concurrent use of (3) solvents, dyes, pigments, and antioxidants, wherein component (2) is from 5 to 70 weight percent, based on the printing ink binder, of a condensation product of 1.5 to 2 equivalents of polymerized fatty acid with 1 equivalent of at least one diprimary ether diamine which may optionally contain at least one co-diamine.

The antislip additives which are used according to the invention are prepared by condensation of a polymerized fatty acid with a diprimary ether diamine, optionally with the concurrent use of a co-diamine.

By polymerized fatty acids are meant products which are obtainable by known methods from unsaturated natural and synthetic monobasic aliphatic acids having from 16 to 22, and preferably 18, carbon atoms.

Typical commerically available polymerized fatty acids, which are also known as dimeric fatty acids, have approximately the following composition:
Monomeric acids: 5 to 15 wt. %
Dimeric acids: 60 to 80 wt. %
Trimeric and higher-polymerized acid: 10 to 35 wt. %

However, dimeric fatty acids which have been hydrogenated by known method and/or whose dimer component has been increased by appropriate distilling methods to over 80 weight percent may also be used. By mixing different dimeric fatty acids with varying contents of the individual components and selective additions of monomeric, dimeric, or trimeric and higher-polymerized fractions, a polymerized fatty acid having the particular composition desired can be prepared.

In accordance with the invention, polymerized fatty acids containing from 60 to 80 weight percent of dimeric fatty acid are preferred.

The diprimary ether diamines used to prepare the condensation products have the general formula $$H_2N—R—NH_2 \qquad (I)$$

wherein
(a) R is , where
   n is an integer from 2 to 5, particularly is 3,
   x is 0, 1, 2 or 3, and
   $R^1$ is alkylene having from 1 to 12 carbon atoms or such alkylene substituted by alkyl having from 1 to 4 carbon atoms, particularly —$CH_3$; or
(b) R is

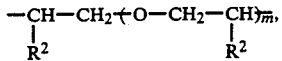

where
   m is an integer from 2 to 35, particularly from 2 to 14, and
   $R^2$ is H or —$CH_3$; or
(c) R is —$(CH_2)_3$—O—[—$(CH_2)_4$—O—]$_k$—$(CH_2)_3$—,
where k is from 4 to 18, particularly from 7 to 11.

Illustrative of ether diamines of the aforementioned formulas which can be prepared by known methods are:
1,7-diamino-4-oxaheptane; 1,7-diamino-3,5dioxaheptane; 1,10-diamino-4,7-dioxadecane; 1,10-diamino-4,7-dioxa-5-methyldecane; 1,11-diamino-4,9-dioxaundecane; 1,11-diamino-4,8-dioxa-5-methylundecane; 1,11-diamino-4,8-dioxa- 5,6-dimetyl-7-propyonylundecane; 1,14-diamino-4,7,10-trioxatetradecane, 1,13-diamino-4,7,10-trioxa-5,8-dimethyltridecane; 1,16-diamino-4,7,10,13-tetraoxahexadecane; 1,20-diamino-4,17-dioxaeicosane; and especially 1,12-diamino-4,9-dioxadodecane, 1,14-diamino-4,11-dioxatetradecane, 1,14-diamino-6,6,8(6,8,8)-trimethyl-4,11-dioxatetradecane, and 1,11-diamino-6,6-dimethyl-4,8-dioxaundecane and the compounds specified in formulas (b) and (c) wherein m is 2 to 14 and k is 7 to 11, respectively.

These ether diamines may be used alone or in admixture with one another.

compounds of the general formula wherein R is aliphatic hydrocarbon having from 2 to 6 carbon atoms in the main chain, optionally substituted by short-chain alkyl groups, and more particularly by methyl, for example 1,2-diaminoethane, 1,2-diaminopropane, 1,3-diaminopropane, diaminobutane, 1,6-diaminohexane, 2,4,4(2,2,4)-trimethyl-1,6-diaminohexane, and 1,3-diamino-2,2-dimethylpropane are suitable for use as co-diamines to be used in accordance with the invention. While the ether diamines may be used alone, the co-diamines should always be used only together with an ether diamine or mixture thereof. When co-diamine is present, it may be present in very slight amounts so that the overall mixing ratio between ether diamine and co-diamine may range from 1.0:0 to 0.2:0.8 and preferably ranges from 0.7:0.3 to 0.3:0.7 and more particularly is 0.5:0.5.

The equivalence ratio between the acid component and the amine component may range from 1.5:1 to 2:1, an equivalence ratio of about 2:1 being preferred in accordance with the invention.

Condensation of the acids and amines is carried out under conditions which are generally known, in other words initially under an inert gas atmosphere and later under a vacuum of about 10 to 20 millibars and at a temperature between 150° and 250° C. for a period of about 6 hours.

The products commonly used in package printing (gravure and flexographic printing) and known to those skilled in the art, for example ketone resins, maleinate resins, acrylate resins, colophony resins, and preferably polyamide resins and nitrocellulose, are suitable for use as printing ink binders.

While the condensation products which have a anti-slip effect in printing ink binders and are used concurrently in accordance with the invention exhibit good compatibility with all conventional binders, they are distinguished by particularly good compatibility with nitrocellulose and the solvents or solvent mixtures commonly used with it.

Typical suitable polyamide resins are known from U.S. Pat. Nos. 3,622,604, 3,483,237, and 3,396,180, for instance.

The nitrocelluloses whose use is preferred in accordance with the invention are low-viscosity alcohol soluble and ester soluble types corresponding to standard types A and E (cf. DIN 53179).

Short chain alcohols or mixtures of such alcohols with aliphatic or aromatic hydrocarbons, esters, or ketones are normally used as solvents for printing ink binders. These solvents include methanol, ethanol, isopropanol, n-propanol, gasoline fractions with normal boiling points between 60° C. and 140° C., toluene, the acetate esters of ethanol, i-propanel, n-propanol, i-butanol, and n-butanol, acetone, methyl-ethyl ketone, and methylisobutyl ketone. The condensation products which are used in accordance with the invention are both readily compatible and dilutable with these solvents.

Dilutability is essential as otherwise clouding due to precipitating resins might occur in use, for example when making up solvent losses, which would have an adverse effect on the surface properties and quality of the coating film. Glossy coating surfaces require that the binders, including additives, give clear solutions and no incompatibility must manifest itself even after the solvent has evaporated.

The printing ink binders are processed in the usual manner as 25 to 40 percent solutions. The condensation products which are used in accordance with the invention, are prepared as highly concentrated solutions, preferably 75 percent solutions.

The dyes, pigments, and antioxidants which optionally are also used in the coating compositions are the commercial products generally used in the printing sector and are well known to those skilled in the art.

Suitable substrates which may be coated with the nonslip coating compositions manufactured in accordance with the inventions are all materials used in the packaging sector, for example paper; cellophane; plastics such as polyethylene, polypropylene, polyester, and polyvinyl chloride; and composite films and sheets made therefrom.

A better understanding of the present invention and of its many advantages will be had by referring to the following specific Examples, given by way of illustration.

The composition of the polymerized fatty acid used in the Examples was as follows:

|  | Type A Wt. % | Type B Wt. % | Type C Wt. % |
| --- | --- | --- | --- |
| Monomeric fatty acid | 2.9 | 3.9 | 1.0 |
| Dimeric fatty acid | 80.0 | 71.9 | 96.8 |
| Trimeric and higher-polymerized fatty acid | 17.1 | 24.2 | 2.2 |

PREPARATION OF NONSLIP ADDITIVE

EXAMPLE 1

2 equivalents of polymerized fatty acid of type A and 1 equivalent of 1,12-diamino-4,9-dioxadodecane were heated to 230° C. over 2 hours under a nitrogen atmosphere and with continuous stirring. After a reaction time of 2 hours at 230° C., a vacuum of about 15 millibars was gradually applied and the reaction was allowed to proceed for another 2 hours. Following cooling to about 100° C., a 75% solution was prepared with ethanol, with stirring and refluxing.

The further resins listed in Table 1 were prepared by the same procedure.

TABLE 1

| Example | Dimeric fatty acid | Equivalents | Ether diamine | Co—diamine | Equivalents Ether diamine | Equivalents Co—diamine |
| --- | --- | --- | --- | --- | --- | --- |
| 1 | Type A | 2 | 1,12-diamino-4,9-dioxadodecane | — | 1 | — |
| 2 | Type A | 2 | 1,14-diamino-4,11-dioxatetradecane | — | 1 | — |
| 3 | Type A | 2 | Bis(3-aminopropyl)polytetrahydrofuran (MW = 1390) | — | 1 | — |
| 4 | Type A | 2 | 1,13-diamino-4,7,10-trioxatridecane | — | 1 | — |
| 5 | Type B | 2 | 1,12-diamino-4,9-dioxadodecane | Ethylenediamine | 0.2 | 0.8 |
| 6 | Type B | 2 | Bis(3-aminopropyl)polytetra-hydrofuran MG 750 | Ethylenediamine | 0.3 | 0.7 |
| 7 | Type A | 2 | Polyoxyethylenediamine (MW = 104) | Ethylenediamine | 0.5 | 0.5 |
| 8 | Type A | 2 | 1,14-diamino-4,11-dioxatetradecane | Ethylenediamine | 0.7 | 0.3 |
| 9 | Type A | 2 | 1,12-diamino-4,9-dioxadodecane | Hexamethylene- | 0.9 | 0.1 |

TABLE 1-continued

| Example | Dimeric fatty acid | Equivalents | Ether diamine | Co—diamine | Equivalents Ether diamine | Equivalents Co—diamine |
|---|---|---|---|---|---|---|
| | | | | diamine | | |
| 10 | Type A | 2 | 1,12-diamino-4,9-dioxadodecane | Trimethylhexa-methylenediamine | 0.7 | 0.3 |
| 11 | Type A | 2 | 1,12-diamino-4,9-dioxadodecane | 1,2-propylene-diamine | 0.5 | 0.5 |
| 12 | Type A | 1.5 | 1,12-diamino-4,9-dioxadodecane | — | 1 | — |
| 13 | Type A | 1.5 | Polyoxyethylenediamine (MW = 676) | Ethylenediamine | 0.8 | 0.2 |
| 14 | Type C | 2 | 1,12-diamino-4,9-dioxadodecane | Ethylenediamine | 0.3 | 0.7 |
| 15 | Type A | 2 | 1,12-diamino-4,9-dioxadodecane 1,14-diamino-4,11-dioxatetradecane | Ethylenediamine | 0.3 0.3 | 0.4 3.85 |
| 16 | Type A | 2 | 1,12-diamino-4,9-dioxadodecane | Ethylenediamine 1,2-propylene-diamine | 0.6 0.2 | 0.2 |
| 17 | Type A | 2 | 1,12-diamino-4,9-dioxadodecane | Ethylenediamine | 0.5 | 0.5 |

Since the resins listed in Table 1 cannot be used alone as film formers, they were combined with a few conventional binders and then tested for their nonslip properties. The conventional binders used were:

(a) Alcohol soluble nitrocellulose
(b) A co-solvent polyamide resin, i.e. a resin soluble in mixture of alcohols (preferably ethanol or isopropanol) with gasoline and/or toluene
(c) An ethanol soluble polyamide resin

DESCRIPTION OF TEST

The conventional binders according to (a) to (c) were in each case dissolved respectively in a 1:1 ethanol-/ethyl acetate mixture, in a 1:1 ethanol/gasoline mixture, and in ethanol to give a 37.5% solution. The condensation products which are used according to the invention were then added as a 75% solution in ethanol in graded amounts (from 5 to 70%, on a solid/solid basis) and thoroughly mixed.

A portion of these solutions was tested for dilutability with the particular solvent or solvent mixture used in a 1:1 mixture while another portion was used to deposit films of a thickness of 12 microns on pretreated polyethylene foil. The appearance of the diluted and undiluted solutions and the films deposited were then evaluated.

These films were stored for 1 day and for 4 weeks under standard climatic conditions (23° C., 50% relative humidity) and then tested manually for their nonslip properties. To this end, the prints were folded to face each other, then thumb pressure was applied to them and an attempt was made to dislodge the upper half of the print by sliding.

Ratings:
1 = Clearly noticeable nonslip effect; foil is stretched considerably in places.
2 = Nonslip effect still adequate.
3 = Nonslip effect inadequate.
4 = Film is tacky, due to excessive amount of nonslip additive, and blocks in the roll.

All samples listed in the Tables which follow were tested and evaluated in this manner.

The co-solvent polyamide resin employed in the tests is prepared from equivalent amounts of dimerized fatty acid and ethylene diamine. The ethanol soluble polyamide comprises equivalent amounts of dimerized fatty acid and a mixture of diamines. The nitrocellulose employed is standard type 23 A (cf. DIN 53179). The commercial polyamide employed for purposes of comparison comprises dimerized fatty acid and excess diethylene triamine and has an amine number of about 90.

As is apparent from Tables 2 and 3, all products exhibited good compatibility with the commercial binders and solvents used. The solutions and films were perfectly clear. The values obtained with respect to the nonslip properties show that, as a rule, the following amounts can readily be used:

(a) Alcohol soluble nitrocellulose:
From 10 to 70%, and preferably from 25 to 55%.
(b) Co-solvent polyamide resin:
From 5 to 25%, and preferably from 10 to 25%.
(c) Ethanol soluble polyamide resin:
From 5 to 25%, and preferably from 5 to 15%.

Figure 2:
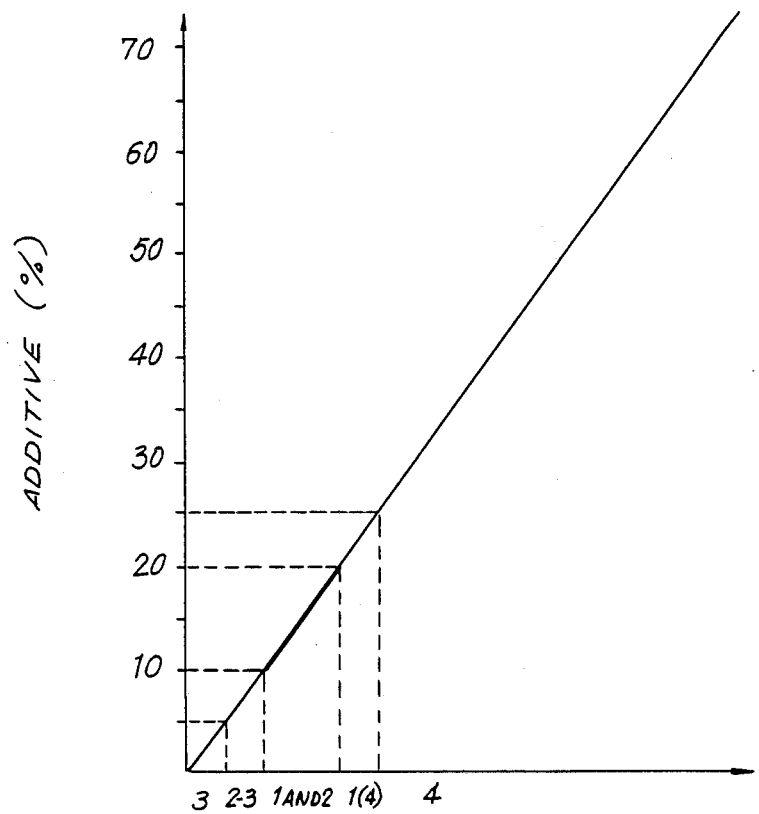

The evaluation further shows that the limits of suitability are not rigidly defined, so that the suitable ranges are merely approximate, as is apparent from accompanying FIGS. 1 and 2, wherein FIG. 1 is a plot of the nonslip effect as a function of the amount of additive to a nitrocellulose resin binder and FIG. 2 is a similar plot for a co-solvent polyamide resin binder.

In these Figures, the transition values between the regions marked on the abscissa are not sharp, i.e. the boundaries between the regions are fluid. Thus, in FIG. 1, compositions containing from about 20 to 25 percent of additive, or from 55 to 60 percent, are not always unusable. Within the region preferred according to the invention (25–55 percent in FIG. 1 and 10–20 percent in FIG. 2), the antislip effect dependably is observed. At the boundaries of these regions, the effect can still appear, but not always, as suggested by the reported values of "2-3", or can appear but be outweighed by undesirable tackiness, as suggested by the value "1(4)".

TABLE 2

| Test No. | Product No. from Table 1 | Amount added (% solid/solid) | Co—solvent polyamide resin(1) (g) | Ethanol-soluble polyamide resin(2) (g) | Alcohol-soluble nitro-cellulose(3) (g) | Solvent Ethanol (g) | Solvent Ethyl acetate (g) | Solvent Gasoline b.p. 80-100° C. (g) |
|---|---|---|---|---|---|---|---|---|
| 1 | 1 | 5 | — | — | 37.5 | 32.5 | 30.0 | — |
| 2 | 1 | 10 | — | — | 37.5 | 32.5 | 30.0 | — |
| 3 | 1 | 20 | — | — | 37.5 | 32.5 | 30.0 | — |
| 4 | 1 | 30 | — | — | 37.5 | 32.5 | 30.0 | — |

TABLE 2-continued

| Test No. | Product No. from Table 1 | Amount added (% solid/solid) | Co—solvent polyamide resin(1) (g) | Ethanol-soluble polyamide resin(2) (g) | Alcohol-soluble nitro-cellulose(3) (g) | Solvent Ethanol (g) | Ethyl acetate (g) | Gasoline b.p. 80–100° C. (g) |
|---|---|---|---|---|---|---|---|---|
| 5 | 1 | 40 | — | — | 37.5 | 32.5 | 30.0 | — |
| 6 | 1 | 50 | — | — | 37.5 | 32.5 | 30.0 | — |
| 7 | 1 | 60 | — | — | 37.5 | 32.5 | 30.0 | — |
| 8 | 1 | 70 | — | — | 37.5 | 32.5 | 30.0 | — |
| 9 | 2 | 40 | — | — | 37.5 | 32.5 | 30.0 | — |
| 10 | 2 | 50 | — | — | 37.5 | 32.5 | 30.0 | — |
| 11 | 3 | 5 | 37.5 | — | — | 27.5 | — | 35.0 |
| 12 | 3 | 10 | 37.5 | — | — | 27.5 | — | 35.0 |
| 13 | 3 | 15 | 37.5 | — | — | 27.5 | — | 35.0 |
| 14 | 3 | 20 | 37.5 | — | — | 27.5 | — | 35.0 |
| 15 | 3 | 25 | 37.5 | — | — | 27.5 | — | 35.0 |
| 16 | 3 | 30 | 37.5 | — | — | 27.5 | — | 35.0 |
| 17 | 4 | 5 | — | 37.5 | — | 62.5 | — | — |
| 18 | 4 | 10 | — | 37.5 | — | 62.5 | — | — |
| 19 | 4 | 15 | — | 37.5 | — | 62.5 | — | — |
| 20 | 4 | 20 | — | 37.5 | — | 62.5 | — | — |
| 21 | 5 | 40 | — | — | 37.5 | 37.5 | 25.0 | — |
| 22 | 5 | 20 | 37.5 | — | — | 32.5 | — | 30.0 |
| 23 | 6 | 40 | — | — | 37.5 | 37.5 | 25.0 | — |
| 24 | 6 | 10 | — | 37.5 | — | 62.5 | — | — |
| 25 | 7 | 40 | — | — | 37.5 | 32.5 | 30.0 | — |
| 26 | 8 | 50 | — | — | 37.5 | 32.5 | 30.0 | — |
| 27 | 9 | 50 | — | — | 37.5 | 32.5 | 30.0 | — |
| 28 | 10 | 40 | — | — | 37.5 | 32.5 | 30.0 | — |
| 29 | 11 | 40 | — | — | 37.5 | 32.5 | 30.0 | — |
| 30 | 12 | 50 | — | — | 37.5 | 32.5 | 30.0 | — |
| 31 | 13 | 50 | — | — | 37.5 | 32.5 | 30.0 | — |
| 32 | 14 | 50 | — | — | 37.5 | 32.5 | 30.0 | — |
| 33 | 15 | 40 | — | — | 37.5 | 32.5 | 30.0 | — |
| 34 | 16 | 50 | — | — | 37.5 | 32.5 | 30.0 | — |
| 35 | 17 | 50 | — | — | 37.5 | 32.5 | 30.0 | — |
| Comparative examples | | | | | | | | |
| 36 | Commercial | 30 | — | — | 37.5 | 32.5 | 30.0 | — |
| 37 | polyamino-amide (4) | 15 | 37.5 | — | — | 32.5 | — | 30.0 |

Legend for Table 2
(1) A polyamide resin comprising equivalent amounts of ethylene diamine and a polymerized fatty acid containing 6.9 percent of monomeric fatty acid, 74.2 percent of dimeric fatty acid, and 18.9 percent of trimeric and higher-polymerized fatty acids.
(2) A polyamide resin comprising equivalent amounts of an amine component comprising a mixture of ethylene diamine and hexamethylene diamine in an equivalence ratio of about 0.6:0.4 and of an acid component comprising the same polymerized fatty acid as in (1) together with propionic acid in an equivalence ratio of about 0.8:0.2.
(3) Nitrocellulose, standard type 23 A, DIN 53179.
(4) A commercial polyamide having an amine value of about 90 and comprising the same polymerized fatty acid as in (1) and diethylene triamine in an equivalence ratio of 1:1.5.

TABLE 3

| Test No. | Appearance Undiluted solution | Appearance Diluted solution | Printed film, 18 micron coating | Nonslip effect after storage for 1 day (See test for explanation of rating) | Nonslip effect after storage for 4 weeks |
|---|---|---|---|---|---|
| 1 | Clear | Clear | Clear | 3 | 3 |
| 2 | Clear | Clear | Clear | 2–3 | 2–3 |
| 3 | Clear | Clear | Clear | 2–3 | 2–3 |
| 4 | Clear | Clear | Clear | 2 | 2 |
| 5 | Clear | Clear | Clear | 1 | 1 |
| 6 | Clear | Clear | Clear | 1 | 1 |
| 7 | Clear | Clear | Clear | 1 (4) | 1 (4) |
| 8 | Clear | Clear | Clear | 4 | 4 |
| 9 | Clear | Clear | Clear | 1 | 1 |
| 10 | Clear | Clear | Clear | 1 | 1 |
| 11 | Clear | Clear | Clear | 3 | 3 |
| 12 | Clear | Clear | Clear | 2–3 | 2–3 |
| 13 | Clear | Clear | Clear | 1 | 1 |
| 14 | Clear | Clear | Clear | 1 | 1 |
| 15 | Clear | Clear | Clear | 1 (4) | 1 (4) |
| 16 | Clear | Clear | Clear | 4 | 4 |
| 17 | Clear | Clear | Clear | 1 | 1 |
| 18 | Clear | Clear | Clear | 1 | 1 |
| 19 | Clear | Clear | Clear | 1 | 1 |
| 20 | Clear | Clear | Clear | 1 (4) | 1 (4) |
| 21 | Clear | Clear | Clear | 1 | 1 |
| 22 | Clear | Clear | Clear | 1 | 1 |
| 23 | Clear | Clear | Clear | 1 | 1 |

TABLE 3-continued

| Test No. | Appearance | | | Nonslip effect after storage for | |
|---|---|---|---|---|---|
| | Undiluted solution | Diluted solution | Printed film, 18 micron coating | 1 day | 4 weeks |
| | | | | (See test for explanation of rating) | |
| 24 | Clear | Clear | Clear | 1 | 1 |
| 25 | Clear | Clear | Clear | 1 | 1 |
| 26 | Clear | Clear | Clear | 1 | 1 |
| 27 | Clear | Clear | Clear | 1 | 1 |
| 28 | Clear | Clear | Clear | 1 | 1 |
| 29 | Clear | Clear | Clear | 1 | 1 |
| 30 | Clear | Clear | Clear | 1 | 1 |
| 31 | Clear | Clear | Clear | 1 | 1 |
| 32 | Clear | Clear | Clear | 1 | 1 |
| 33 | Clear | Clear | Clear | 1 | 1 |
| 34 | Clear | Clear | Clear | 1 | 1 |
| 35 | Clear | Clear | Clear | 1 | 1 |
| Comparative examples: | | | | | |
| 36 | Incompatible; not usable | | | | |
| 37 | Clear | Clear | Clear | 1 | 3 |

What is claimed is:

1. A nonslip coating composition comprising
   (1) a compound known in the art as a printing ink binder and selected from the group consisting of
      (a) alcohol soluble nitrocellulose,
      (b) a co-solvent soluble polymide resin,
      (c) an alcohol soluble polyamide resin, and
   (2) from 5 to 70 percent, by weight of said compound, of an antislip agent which is a condensation product formed between an acid component and an amine component in an equivalence ratio from 1.5:1 to 2:1, said acid component being a polymerized fatty acid and said amine component comprising at least one diprimary ether diamine.

2. A nonslip coating composition as in claim 1 wherein said equivalence ratio is 2:1.

3. A nonslip coating composition as in claim 1 comprising an ether diamine selected from the group consisting of 1,12-diamino-4,9-dioxadodecane, 1,14-diamino-4,11-dioxatetradecane, 1,13-diamino-4,7,10-trioxatridecane,

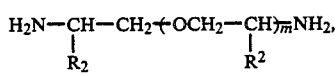

where m is an integer from 12 to 14 and $R^2$ is —H or —$CH_3$, and $H_2N$—$(CH_2)_3$—O—$[(CH_2)_4$—O—$]_k(CH_2)_3$—$NH_2$.

4. A nonslip coating composition as in claim 1 wherein said amine component additionally comprises a co-diamine in a equivalence ratio of ether diamine to co-diamine up to 0.2:0.8.

5. A nonslip coating composition as in claim 4 wherein said co-diamine is 1,2-diaminoethane.

6. A nonslip coating composition as in claim 2 wherein said acid component is a polymerized fatty acid having a dimer content from 60 to 80 percent by weight and said amine component comprises 1,12-diamino-4,9-dioxadodecane and 1,2-diaminoethane in an equivalence ratio of 0.5:0.5.

7. A polyamide condensation product adaptable to use as an antislip agent, formed between an acid component and an amine component in an equivalence ratio from 1.5:1 to 2:1, said acid component being a polymerized fatty acid and said amine component comprising at least one diprimary ether diamine.

8. A polyamide condensation product as in claim 7 wherein said equivalence ratio is 2:1.

9. A polyamide condensation product as in claim 7 comprising an ether diamine selected from the group consisting of 1,12-diamino-4,9-dioxadodecane, 1,14-diamino-4,11-dioxatetradecane, 1,13-diamino-4,7,10-trioxatridecane,

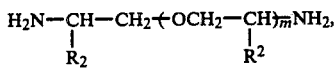

where m is an integer from 12 to 14 and $R^2$ is —H or —$CH_3$, and $H_2N$—$(CH_2)_3$—O—$[(CH_2)_4$—O—$]_k(CH_2)_3$—$NH_2$.

10. A polyamide condensation product as in claim 7 wherein said amine component additionally comprises a co-diamine in a equivalence ratio of ether diamine to co-diamine up to 0.2:0.8.

11. A polyamide condensation product as in claim 10 wherein said co-diamine is 1,2-diaminoethane.

12. A polyamide condensation product as in claim 8 wherein said acid component is a polymerized fatty acid having a dimer content from 60 to 80 percent by weight and said amine component comprises 1,12-diamino-4,9-dioxadodecane and 1,2-diaminoethane in an equivalence ratio of 0.5:0.5.

* * * * *